US010876894B2

(12) United States Patent
Smith et al.

(10) Patent No.: US 10,876,894 B2
(45) Date of Patent: Dec. 29, 2020

(54) TRANSMISSION RAMAN SPECTROSCOPY (71) Applicant: RENISHAW PLC, Wotton-under-Edge (GB)

(72) Inventors: Timothy Smith, Dursley (GB); Richard John Blackwell-Whitehead, Dursley (GB)

(73) Assignee: RENISHAW PLC, Wotton-under-Edge (GB)

(*) Notice: Subject to any disclaimer, the term of this patent is extended or adjusted under 35 U.S.C. 154(b) by 0 days.

(21) Appl. No.: 15/552,752

(22) PCT Filed: Mar. 8, 2016

(86) PCT No.: PCT/GB2016/050630
§ 371 (c)(1),
(2) Date: Aug. 22, 2017

(87) PCT Pub. No.: WO2016/142699
PCT Pub. Date: Sep. 15, 2016

(65) Prior Publication Data
US 2018/0045570 A1 Feb. 15, 2018

(30) Foreign Application Priority Data

Mar. 9, 2015 (GB) .................................. 1503911.8

(51) Int. Cl.
G01J 3/44 (2006.01)
G01J 3/06 (2006.01)
(Continued)

(52) U.S. Cl.
CPC . *G01J 3/44* (2013.01); *G01J 3/06* (2013.01); *G01N 21/65* (2013.01); *G02B 21/002* (2013.01);
(Continued)

(58) Field of Classification Search
CPC .................................. G01J 3/44; G01N 21/65
See application file for complete search history.

(56) References Cited

U.S. PATENT DOCUMENTS 3,442,591 A 5/1969 Ogura et al.
4,714,345 A 12/1987 Schrader
(Continued)

FOREIGN PATENT DOCUMENTS

EP 2106538 B1 5/2010
EP 2385362 A1 11/2011
(Continued)

OTHER PUBLICATIONS

Pelletier, M. "Sensitivity-Enhanced Transmission Raman Spectroscopy." Applied Spectroscopy, vol. 67., No. 8, pp. 829-840, 2013.
(Continued)

*Primary Examiner* — Hina F Ayub
(74) *Attorney, Agent, or Firm* — Oliff PLC (57) ABSTRACT A transmission Raman spectroscopy apparatus has a light source for generating a light profile on a sample, a photodetector having at least one photodetector element, collection optics arranged to collect Raman scattered light transmitted through the sample and direct the Raman light onto the at least one photodetector element and a support for supporting the sample. The support and light source are arranged such that the light profile can be moved relative to the sample in order that the at least one photodetector element receives Raman scattered light generated for different locations of the light profile on the sample.

9 Claims, 6 Drawing Sheets (51) Int. Cl.
*G01N 21/65* (2006.01)
*G02B 21/00* (2006.01)

(52) U.S. Cl.
CPC .. *G01J 2003/064* (2013.01); *G01N 2201/103* (2013.01); *G01N 2201/1045* (2013.01); *G01N 2201/1087* (2013.01)

(56) References Cited

U.S. PATENT DOCUMENTS

| | | | |
|---|---|---|---|
| 4,807,991 A * | 2/1989 | Carew | G01N 21/6456 219/121.83 |
| 5,194,913 A | 3/1993 | Myrick et al. | |
| 6,201,601 B1 * | 3/2001 | Vaez-Iravani | G01J 3/44 356/237.4 |
| 6,289,230 B1 | 9/2001 | Chaiken et al. | |
| 6,595,678 B2 | 7/2003 | Folestad et al. | |
| 6,654,118 B2 | 11/2003 | Bruce | |
| 6,897,951 B2 | 5/2005 | Womble et al. | |
| 6,919,556 B1 | 7/2005 | Laurence | |
| 7,110,109 B2 | 9/2006 | Knopp et al. | |
| 7,219,568 B2 | 5/2007 | Folestad et al. | |
| 8,085,396 B2 | 12/2011 | Matousek et al. | |
| 8,310,671 B1 | 11/2012 | Nguyen et al. | |
| 2004/0263843 A1 | 12/2004 | Knopp et al. | |
| 2005/0277816 A1 | 12/2005 | Maier et al. | |
| 2005/0280817 A1 * | 12/2005 | Horchner | G01J 3/2803 356/318 |
| 2006/0055919 A1 * | 3/2006 | Lee | G01N 21/65 356/301 |
| 2006/0249423 A1 | 11/2006 | Reijonen | |
| 2009/0310132 A1 | 12/2009 | Bennett et al. | |
| 2010/0141939 A1 | 6/2010 | Zhan | |
| 2012/0050733 A1 | 3/2012 | Takimoto | |
| 2012/0092663 A1 | 4/2012 | Kull et al. | |
| 2017/0160200 A1 | 6/2017 | Mikami et al. | |

FOREIGN PATENT DOCUMENTS

| | | |
|---|---|---|
| EP | 2 982 968 A1 | 2/2016 |
| EP | 2243008 B1 | 8/2018 |
| FR | 2566903 A1 | 1/1986 |
| GB | 2162961 A1 | 2/1986 |
| GB | 2432661 A | 5/2007 |
| JP | 2003522635 A | 7/2003 |
| JP | 2006-113021 A | 4/2006 |
| JP | 2009-047435 A | 3/2009 |
| JP | 2010-517029 A | 5/2010 |
| JP | 2011-510317 A | 3/2011 |
| JP | 2015-017971 A | 1/2015 |
| JP | 2015-175677 A | 10/2015 |
| JP | 2016-522994 A | 8/2016 |
| WO | 97/22872 A1 | 6/1997 |
| WO | 01/57500 A1 | 8/2001 |
| WO | 2005/060622 A2 | 7/2005 |
| WO | 2009/031838 A1 | 3/2009 |
| WO | 2010/095263 A1 | 8/2010 |
| WO | 2012/030988 A1 | 3/2012 |
| WO | 2014/162744 A1 | 10/2014 |
| WO | 2015/009970 A1 | 1/2015 |
| WO | 2015/136939 A1 | 9/2015 |

OTHER PUBLICATIONS

Aug. 1, 2016 Search Report issued in International Patent Application No. PCT/GB2016/050630.
Aug. 19, 2015 Search Report issued in British Application No. 1503911.8.
Aug. 1, 2016 Written Opinion issued in International Patent Application No. PCT/GB2016/050630.
Schrader et al. "Laser-Based Molecular Spectroscopy for Chemical Analysis: Raman Scattering Process". International Union of Pure and Applied Chemistry, 1997.
Schrader et al. "Die Intensität des Ramanspektrums polykristalliner Substanzen". pp. 230-247, 1966.
Niemczyk et al. "Quantitative Determination of Bucindolol Concentration in Intact Gel Capsules Using Raman Spectroscopy". Analytical Chemistry, vol. 70, pp. 2762-2765, 1998.
Kontoyannis et al. "Quantitative Non-Destructive Determination of Salicylic Acid Acetate in Aspirin Tablets by Raman Spectroscopy". Talanta, vol. 41, pp. 1981-1984, 1994.
Mooeung Kim, et al. "Accurate determination of polyethylene pellet density using transmission Raman spectroscopy", Journal of Raman Spectroscopy, vol. 42, No. 11, pp. 1967-1976, 2011.
Gonzalvez, A. G., et al., "Monitoring LED-induced carotenoid increase in grapes by Transmission Resonance Raman spectroscopy", Chemical Physics Letters, vol. 559, pp. 26-29, 2013.

* cited by examiner

TRANSMISSION RAMAN SPECTROSCOPY

FIELD OF THE INVENTION

This invention relates to apparatus and methods for use in transmission Raman spectroscopy.

BACKGROUND

In Raman spectroscopic apparatus light from a laser source is typically focussed to a spot on a sample. Interaction between the light and the molecules of the sample causes Raman scattering into a spectrum having wavenumbers which are shifted relative to the exciting laser frequency. After filtering out the laser frequency, a spectrum of the Raman scattered light is usually dispersed by a dispersive device, such as a diffraction grating, across a two-dimensional photodetector array, e.g. in the form of a charge-coupled device (CCD). Different molecular species have different characteristic Raman spectra, and so the effect can be used to analyse the molecular species present. The Raman spectrum can also give other information, such as the local stresses or strains in the sample.

The most widely used form of Raman spectroscopy is back-scattered Raman spectroscopy, wherein the collection optics for collecting the Raman scattered light is located on the same side of a sample as the illumination optics. In such an arrangement, the Raman signal is representative of surface and near-surface composition of the sample.

In transmission Raman, the collection optic is located on the other side of the sample from the illumination optics such that Raman scattered light that is transmitted through the sample is collected by the collection optics. As a result, the Raman signal is representative of a bulk of material through which the light passes. (The collection volume from which Raman scattered light is collected in a transmission Raman system is largely determined by the illumination, collection optics, sensitivity of the detector and the material properties of the sample but is typically much larger than that for back-scattered Raman). This makes transmission Raman suitable for probing the bulk content of diffusely scattering samples, wherein it is desirable to obtain a Raman signal representative of an entire mixture of material within a collection volume.

M. Pelletier, "Sensitivity-Enhanced Transmission Raman Spectroscopy", Applied Spectroscopy, Volume 67, 2013, pages 829 to 839 describes a transmission Raman system that comprised a laser delivered through a fibre mounted to the moving part of a translation stage holding a tablet (to be analysed), so that movement of the tablet during mapping did not change the location of the laser illumination on the tablet. A PhAT™ probe imaged the sample into a bundle of 50 optical fibres. A transmission Raman map was produced from the data recorded by the PhAT™ probe.

The inventor has found that, even though the collection volume is relatively large for transmission Raman spectroscopy compared to back-scattered Raman spectroscopy, for certain applications the collection volume is still relatively small compared to a volume that is required in order to obtain a Raman signal that is representative of an entire mixture within a sample, such as a medicament.

SUMMARY OF THE INVENTION

According to a first aspect of the invention there is provided a transmission Raman spectroscopy apparatus comprising:

a light source for generating a light profile on a sample;
a photodetector having at least one photodetector element;
collection optics arranged to collect Raman scattered light transmitted through the sample and direct the Raman light onto the at least one photodetector element;
a support for supporting the sample,
wherein the support and light source are arranged such that the light profile can be moved relative to the sample in order that the at least one photodetector element receives Raman scattered light generated for different locations of the light profile on the sample.

In this way, one can obtain a Raman signal that is representative of a composition throughout a thickness of a sample and for a volume of the sample that is greater than a static acquisition collection volume defined by the light profile when stationary. For example, the apparatus may be used to obtain a Raman signal representative of an overall composition of the sample, such as a tablet, and/or to determine an extent to which a sample is homogenous across a volume greater than the static acquisition collection volume.

The apparatus may comprise a controller arranged to control the photodetector, and the light source and/or the support such that data, on Raman light generated by interaction of the light profile with the sample, is accumulated in the at least one photodetector element for a plurality of locations of the light profile on the sample.

In this way, the data accumulated in the at least one photodetector element represents a summation of the Raman scattered light for a volume of the sample that is greater than the static acquisition collection volume. Furthermore, the accumulation of the data can be carried out without reading out data from the photodetector elements, which would increase the time for data collection and create additional readout noise.

The apparatus may comprise a controller arranged to control the photodetector, and the light source and/or the support such that the at least one photodetector element collects data on Raman light generated by interaction of the light profile with the sample separately for each one of a plurality of locations of the light profile on the sample.

In this way, the separately collected data can be mapped onto the sample based on the location of the light profile on the sample when the data was collected.

In one embodiment, data collected by the at least one photodetector element on Raman light generated by interaction of the light profile with a given region of the sample is read out from the photodetector before the at least one photodetector element collects data on Raman light generated by interaction of the light profile with a different given region of the sample.

The photodetector element may comprise at least one row or column of photodetector elements and data collected by the at least one photodetector element on Raman light generated by interaction of the light profile with a given region of the sample is shifted to another photodetector element of the row or column synchronously with movement of the light profile on the sample such that the at least one photodetector element can separately collect data on Raman light generated by interaction of the light profile with a different given region of the sample.

The controller may be arranged to control the photodetector element, and the light source and/or the support such that the at least one photodetector element accumulates data for a plurality of given regions within a first section of the sample separately from data accumulated for a plurality of given regions within a second section of the sample. Accumulating data for a large section of the sample in a single photodetector element may saturate the photodetector element, whereas high resolution down to the static acquisition collection volume may not be required/desired, such as in the case that particle sizes of the sample are of the same order as the static acquisition collection volume. By accumulating data for sections of the sample comprising a plurality of given regions allows collection of data on the photodetector at a lower resolution that may be more representative of an overall composition of the sample whereas separate collection for each section avoids saturation of the photodetector element.

The relative movement between the sample and the light profile may comprise a raster scan. For example, the support may be mounted on a stage arranged to move along two linear axes.

The relative movement between the sample and the light profile may comprise a spiral scan. For example, the support may be arranged to rotate about an axis with the light source arranged to move the light profile along a linear path (relative to the axis). An angular speed of rotation of the support and/or velocity that the light profile is moved along the linear path may be varied such that an exposure time for each given region along the spiral scan is substantially the same. Spiral scans may be preferable to raster scans as there may be fewer delays as a result of accelerations/de-accelerations of the support/optics in the light source.

The photodetector may comprise a two-dimensional array of photodetector elements and the collection optics a dispersive device for dispersing a spectrum of the Raman scattered light across at least one row or column of the array.

The light source may be arranged to form a light profile comprising a spot or a line. In the case of the light profile comprising a line, the data collected by the at least one photodetector element on Raman light generated by interaction of the light profile with a given region of the sample may be shifted to another photodetector element of the row or column synchronously with movement of the line on the sample such that data on Raman light generated by interaction of the light profile with the given region of the sample is accumulated across a plurality of the photodetector elements.

According to a second aspect of the invention there is provided a method of carrying out transmission Raman spectroscopy on a sample comprising:
 moving a light profile on a sample;
 collecting Raman scattered light transmitted through the sample that has been generated by interaction of the light profile with the sample at different locations on the sample and directing the Raman light onto at least one photodetector element of a photodetector such that the photodetector element receives the Raman scattered light.

According to a third aspect of the invention there is provided a data carrier having instructions stored thereon, which, when executed by a controller of a transmission Raman spectroscopy apparatus according to the first aspect of the invention, causes the controller to control the apparatus to carry out the method of the second aspect of the invention.

According to a fourth aspect of the invention there is provided a method of determining whether a plurality of flowable materials have been adequately mixed, comprising:—
 carrying out transmission Raman spectroscopy on a sample of the mixed flowable materials to obtain spectral data;
 fitting a predetermined reference spectrum to the spectral data, wherein the predetermined reference spectrum is a reference spectrum for a mix of the plurality of flowable materials in a desired ratio; and
 determining whether the plurality of flowable materials have been adequately mixed based upon a figure of merit quantifying an extent to which the predetermined reference spectrum fits the spectral data.

Such a method may allow one to quickly determine whether a plurality of flowable materials have been adequately mixed. In particular, such a method may be useful to determine whether a desired ratio of materials has been achieved or a closeness of the mixed flowable materials to the desired ratio without carrying out more complex analysis that would be required to determine concentrations for each individual flowable material. This method may be useful in production lines comprising the mixing of powders, such as in the manufacture of a medicament or washing powder, for monitoring whether a mixing process stays within predetermined limits. If the mixing process does fall outside the predefined limits, the method may provide an indication that such an event has occurred and further investigations can be carried out to determine how the mixing process has violated the limits, for example by determining the concentrations for each individual flowable material. In other words, the method of the invention may be used in a manufacturing process to provide a go/no go check.

The fitting may comprise resolving a concentration for the predetermined reference spectrum using a direct least squares fitting of the predetermined reference spectrum to the spectral data. The figure of merit may be the determined concentration. The plurality of flowable material may be deemed adequately mixed if the concentration is above a predetermined threshold. The predetermined threshold for the concentration may be determined empirically. The predetermined threshold is likely to depend upon, amongst other factors, the requirements for the mix. For example, greater divergence from the desired ratio may be more acceptable in the mixing of flowable materials for washing powder compared to the mixing of flowable materials in the manufacture of a medicament.

The method of the fourth aspect of the invention may be used in combination with the method of second aspect of the invention. The spectral data may be a summation of the Raman scattered light for a volume of the sample that is greater than a static acquisition collection volume. Alternatively, the spectral data may be separate Raman spectra collected for different locations of the light profile on the sample.

The predetermined reference spectrum may be a blended reference spectrum constructed by scaling reference spectrum for each individual flowable material by amounts appropriate for the desired ratio, for example in accordance with the Beer-Lambert law.

According to a fifth aspect of the invention there is provided a data carrier having instructions stored thereon, which, when executed by a processor, causes the processor to carry out the method of the third aspect of the invention.

The data carrier of the above aspects of the invention may be a suitable medium for providing a machine with instructions such as non-transient data carrier, for example a floppy disk, a CD ROM, a DVD ROM/RAM (including −R/−RW and +R/+RW), an HD DVD, a Blu Ray™ disc, a memory (such as a Memory Stick™, an SD card, a compact flash card, or the like), a disc drive (such as a hard disc drive), a tape, any magneto/optical storage, or a transient data carrier, such as a signal on a wire or fibre optic or a wireless signal, for example a signals sent over a wired or wireless network (such as an Internet download, an FTP transfer, or the like).

DESCRIPTION OF EMBODIMENTS

Figure 1:
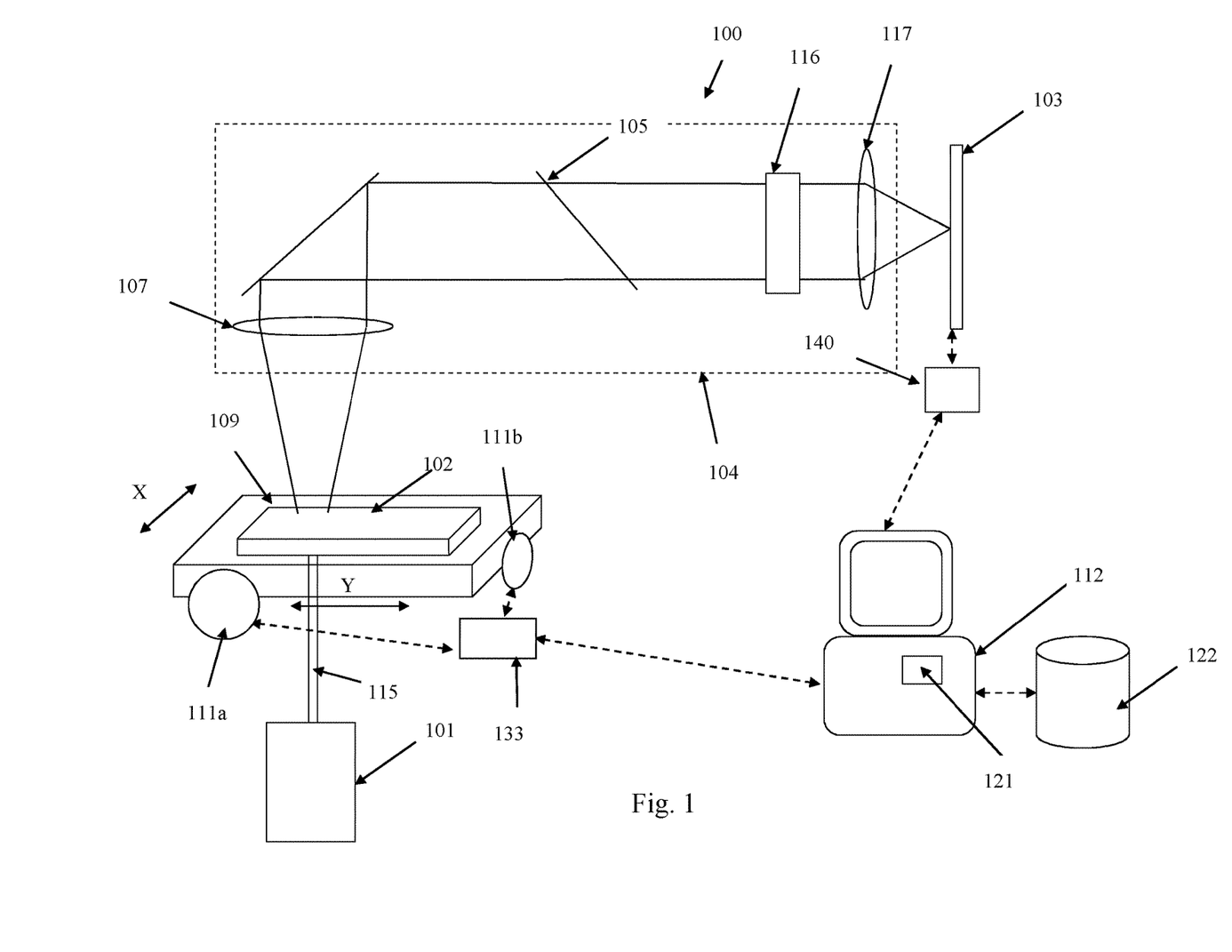
FIG. 1 is a schematic view of transmission Raman spectroscopy apparatus according to an embodiment of the invention.
Figure 2:
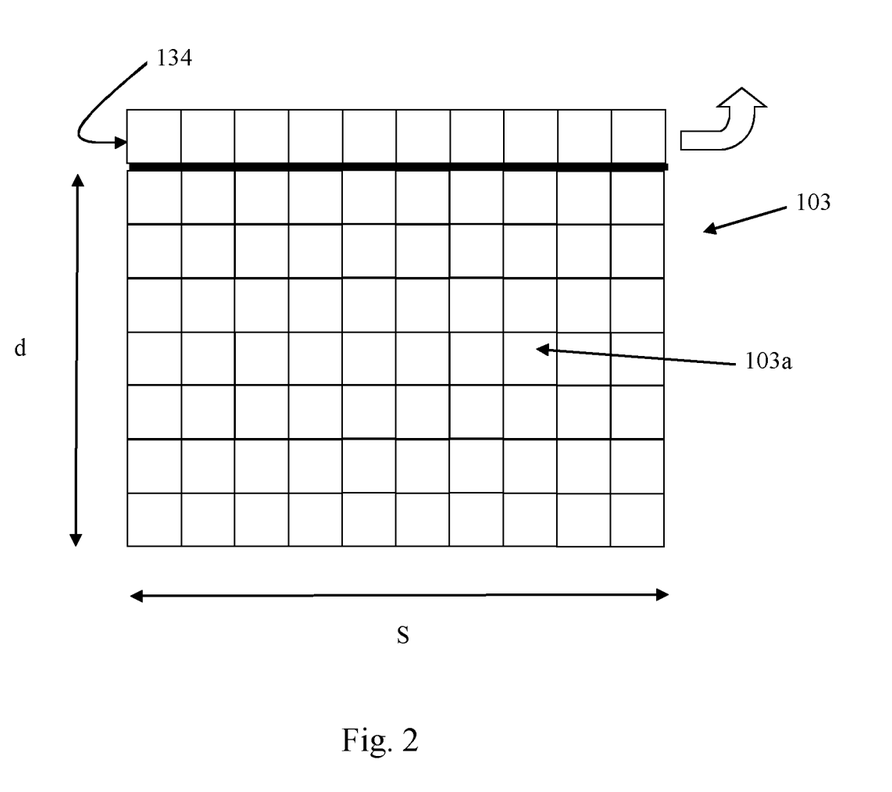
FIG. 2 is a schematic view of a photodetector of the transmission Raman spectroscopy apparatus shown in FIG. 1.
Figure 3:
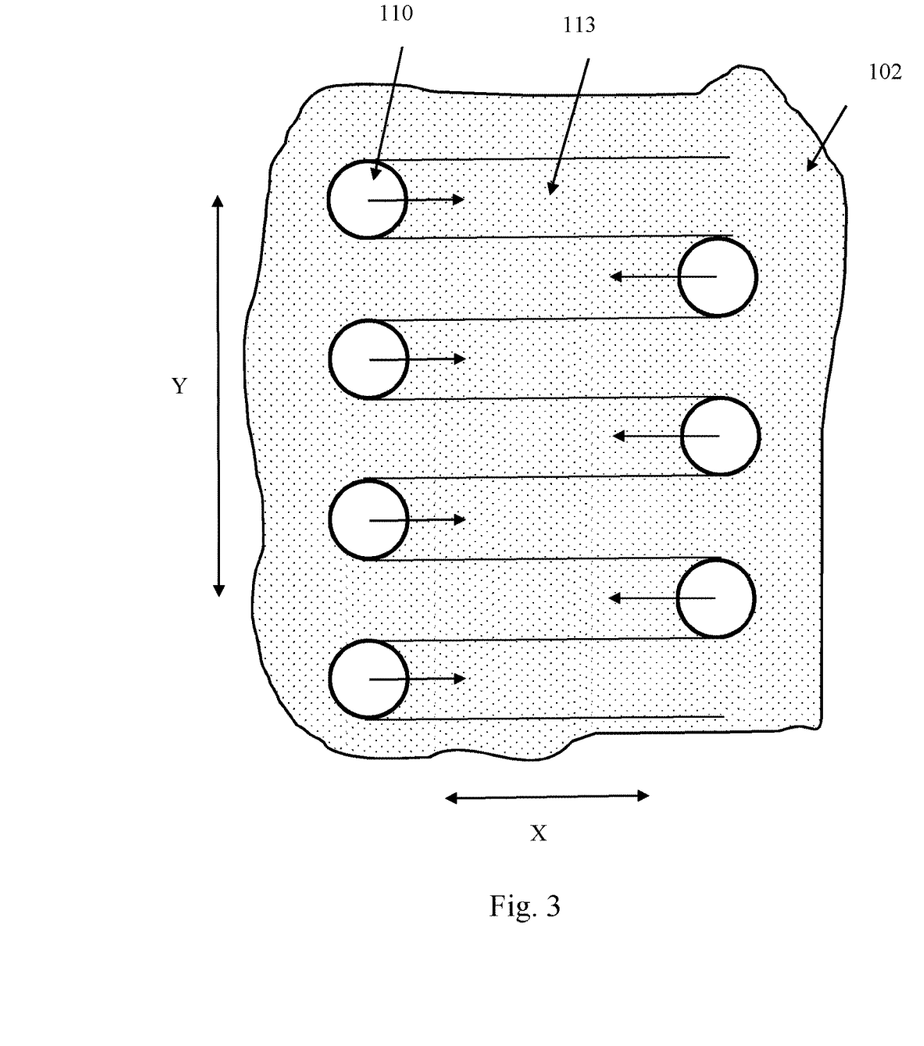
FIG. 3 shows a spot generated by the transmission Raman spectroscopy apparatus moving in a raster scan across the sample.

Referring to FIGS. 1 to 3, a transmission Raman spectroscopy apparatus 100 comprises a light source 101 arranged for generating a light profile 110 for illuminating a sample 102 and a photodetector 103 having a plurality of photodetector elements 103a for detecting light scattered from the sample 102.

The light source 101 comprises a laser and beam conditioning optics, such as suitable lenses and mirrors (not shown) for shaping and collimating a laser beam 115. The laser beam 115 is directed onto the sample 102 supported on a movable stage 109. In this embodiment, the laser beam 115 is shaped to form a spot 110 on sample 102.

The stage 109 is movable to move the sample 102 relative to the spot 110 in perpendicular directions X and Y. Motors 111a, 111b are provided for driving motion of the stage 109 in each direction. Movement of the motor 111a, 111b may be under control of a stage controller 133. The stage controller 133 is arranged for communicating with computer 112.

The stage 109 has a hole (not shown) therein to allow the laser light to impinge on the sample 102. Flowable samples, such as powders or liquids, may be mounted above the hole on material transparent to the laser wavelength, such as a glass slide or a diamond film.

Illumination of the sample 102 by the laser beam 115 generates Raman scattered light at different frequencies/wavenumbers to the laser frequency/wavenumber. A fraction of the scattered light is transmitted through the sample 102 and collected by collection optics 104, which directs the Raman scattered light to the photodetector 103. In this embodiment, the collection optics 104 comprises a microscope objective lens 107 for directing Raman scattering light transmitted through the sample 102 along an optical path comprising a filter 105 for filtering out light of the laser wavelength, an optical element 116, such as a diffraction grating, for spectrally dispersing the scattered light across the photodetector 103 and a focussing lens 117 for focussing the spectrally dispersed light onto the photodetector 103.

The objective lens 107 and the laser 101 are fixed relative to each other.

In this embodiment, the photodetector 103 is a charge coupled device (CCD) comprising a two-dimensional array of photodetector elements 103a. However, other detectors are possible, such as a two-dimensional CMOS photodetector array. The diffraction grating disperses the spectrum of scattered light in a direction, s, across a row or column of photodetector elements 103a of the CCD 103.

The photodetector 103 comprises a processor 140, which controls the charge coupled device. The processor 140 is arranged to communicate, such as via a USB bus, with computer 112 and through a further communication line, such as a serial communication bus, with stage controller 133. The processor 140 and photodetector array 103 may be built as a single unit.

Computer 112 comprises a processing unit 121, which executes instructions in computer programs stored in memory 122. As will now be described, the computer 112, processor 140 and stage controller 133 control movement of the stage and shifting and reading of charge in the CCD 103 to move the spot across the sample 102 and record data representative of spectral values for light scattered from the sample for the different locations of the spot on the sample 102. However, it will be understood that, in other embodiments, other combinations of processors and distributions of processing may be used.

The user can select, for example using computer 112, to carry out either one of two modes of data collection.

In a first mode of data collection, the spot is moved relative to the sample with charge being accumulated in each photodetector element 103a of the CCD 103 for a plurality of locations of the spot on the sample 102. In this way, the charge accumulated in each photodetector element represents a summation of the transmission Raman scattered light from given regions of the sample 102 spread across the sample 102 over a distance greater than a diameter of the spot 110 (as shown in FIG. 2). Accordingly, the output of the CCD 103 is a Raman spectrum that is representative of the constituents/chemical make-up of all volumes illuminated by the spot 110.

In FIG. 3, the stage 109, movable in linear directions X and Y, is driven such that the spot 110 performs a raster scan 113 across the sample 102. The spot 110 is moved along each hatch of the raster scan at a constant velocity. In the first mode, charge is accumulated in each photodetector element 103a for each location of the spot 110 along the raster scan 113.

Figure 4:
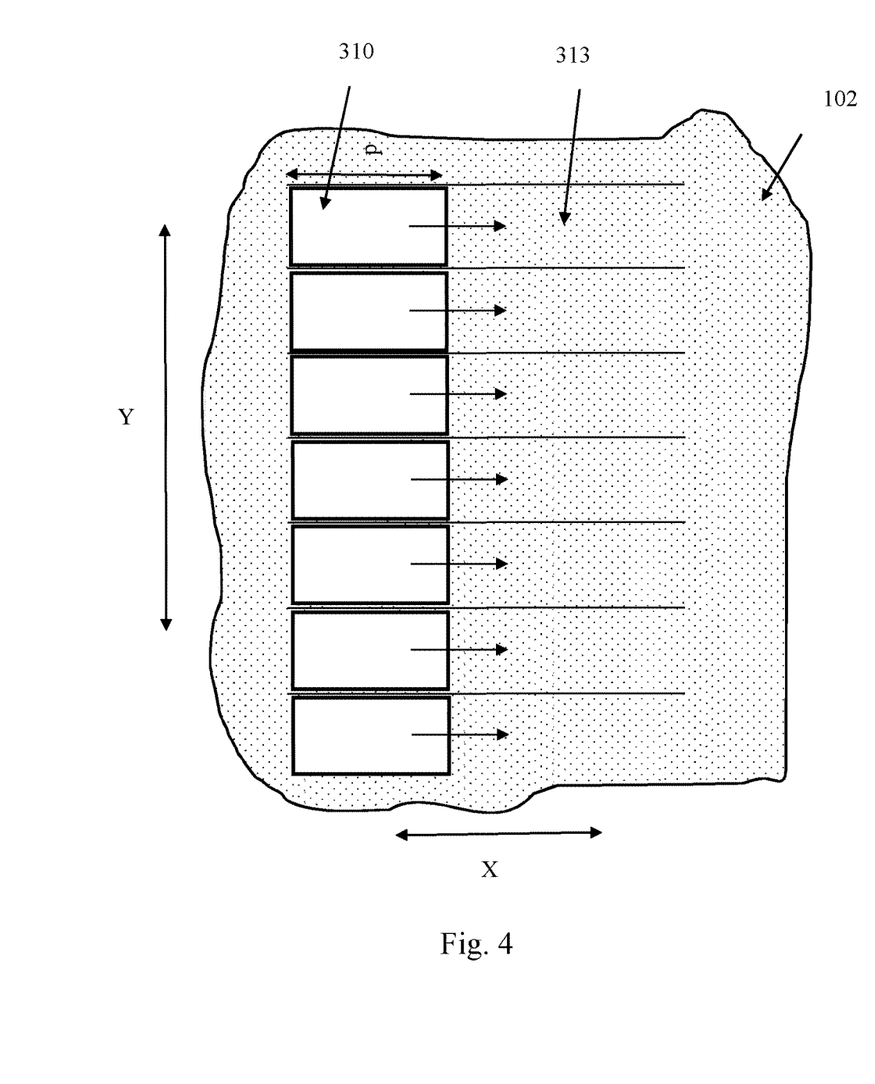
FIG. 4 shows a line generated by the transmission Raman spectroscopy apparatus moving in a raster scan across the sample.

FIG. 4 shows an alternative embodiment in which the laser is shaped to form a line 310 on the sample 102. The line is moved across the sample 102 in a raster scan in either or both directions X and Y (parallel to a longitudinal direction of the line 310 and perpendicular to a direction of the line 310). In the first mode, charge is accumulated in each photodetector element 103a for each location of the line 310 along the raster scan 313.

In a second mode of operation, the spot 110 is scanned across the sample 102 in a like manner to the first mode of collection. However, rather than moving the spot 110 at a constant velocity, the spot 110 may be driven across the sample 102 in a series of staccato movements, with the processor 140 synchronised with the movement of the spot 110 such that data is read out from the photodetector elements 103a during each step. In this way, a Raman spectrum is obtained for each location of the spot 110 and a map can be made from analysing the Raman spectra obtained for the different locations of the spot 110 on the sample 102.

For the line 310, rather than a series of staccato movements for the second mode of operation, the line 310 may be moved at a constant velocity across the sample 102 in a direction parallel to the longitudinal direction of the line (as shown in FIG. 4). The processor 140 is synchronised with the movement of the line 110 such that charge collected by a photodetector element 103a is transferred to an adjacent photodetector element 103a synchronously with movement of the line 310 such that data on Raman scattered light originating from a given region on the sample 102 is accumulated in a plurality of photodetector elements 103a of a row or column of the detector 103 as the line moves across that given region. The accumulated charge is eventually shifted into a readout register 134 from which the data on the accumulated charge is transferred to computer 112.

The collection optics 104 may be arranged such that Raman scattered light generated by the line 310 is distributed across the entire length, d, of the photodetector 103 with the photodetector elements 103a furthest from the readout register 134 receiving Raman scattered light generated by the sample from interaction with a leading portion of the line 310 and the photodetector elements 103a closest to the readout register 134 receiving Raman scattered light generated by the sample from interaction with a trailing portion of the line 310. By collecting data for each given region when illuminated by each portion of the line 310, variations in intensity of the data accumulated by the photodetector for each given region as a result of variations in intensity of the line 310 across its length can be avoided.

The Raman spectra obtained for the given regions of the sample 102 can be mapped onto the sample, as required.

The first mode of collection may be used when the user wants to obtain a Raman spectrum that is representative of an overall composition of the scanned volume. For example, in the production of medicaments it may be desirable to determine the relative amounts of active ingredients present in a tablet, the distribution of these ingredients being of less importance. A scan according to the first mode of collection may be used to provide such information.

The second mode of collection may be used when the information on a distribution through the sample, such as a medicament, is desired. For example, when mixing ingredients, a length of time the ingredients are mixed should be long enough to ensure a homogenous mixture but not too long such that clumping of the ingredients starts to occur. The system of the invention can be used to determine an extent to which ingredients have been mixed during a mixing process and therefore, as feedback in the mixing process to indicate when the mixing process should be stopped. Samples may be taken from a mixing container at periodic time intervals during the mixing process and these samples analysed using the system of the invention. A map of the constituents in the sample can be produced and this map analysed to determine if the sample is a homogeneous mixture of the ingredients. A series of maps may be produced and the user may extrapolate from the maps a time at which the mixing process should be stopped.

Figure 5:
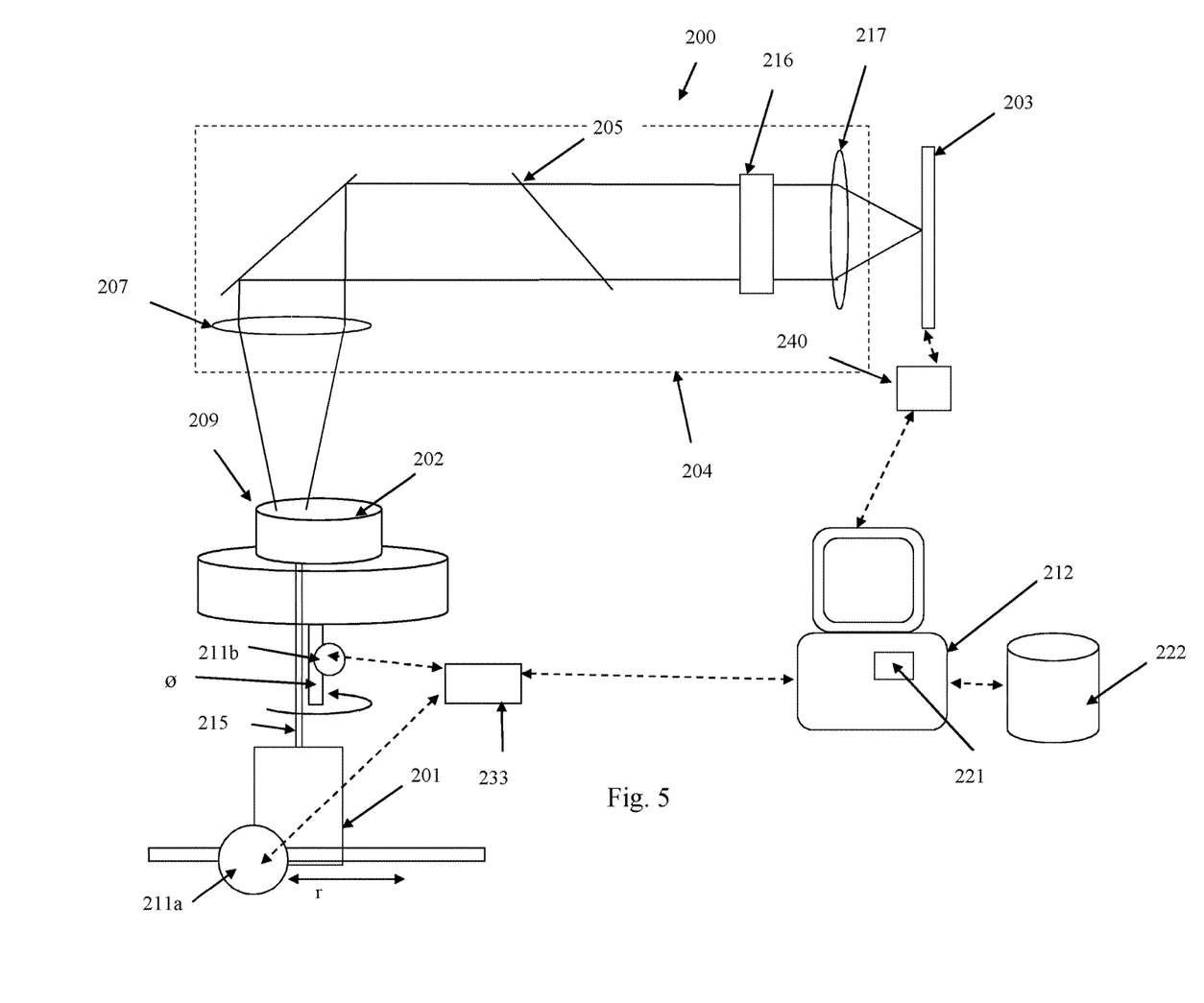
FIG. 5 is a schematic view of transmission Raman spectroscopy apparatus according to another embodiment of the invention.
Figure 6:
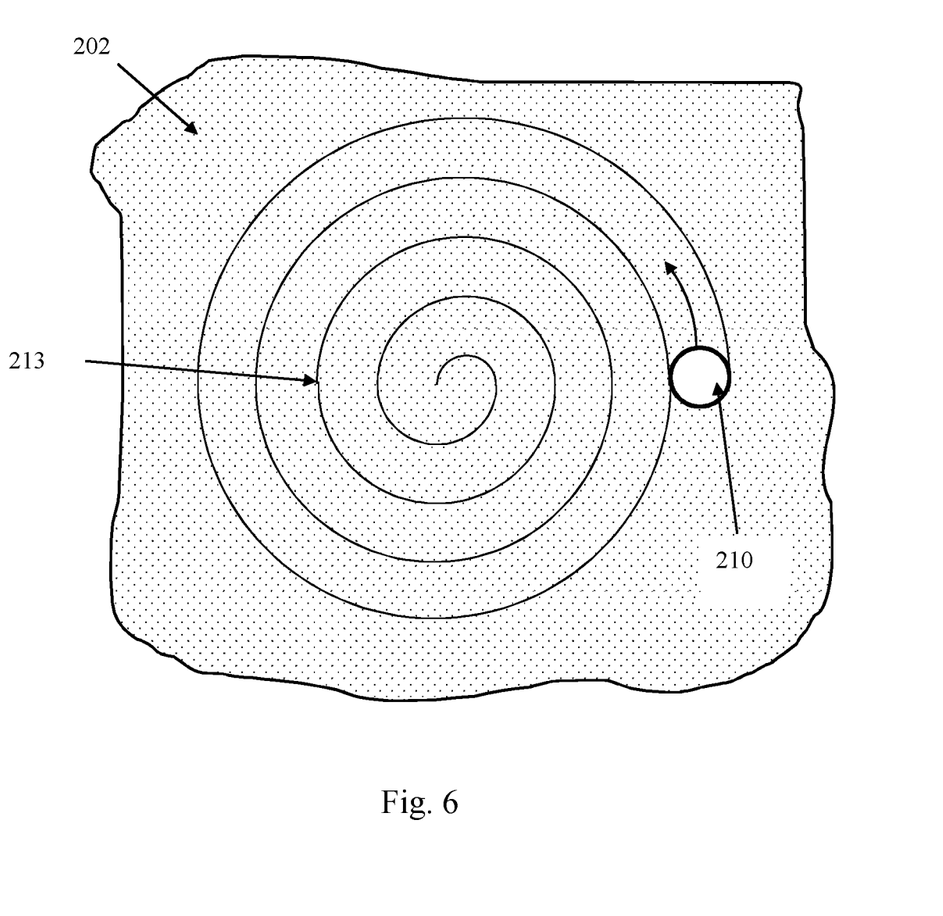
FIG. 6 shows a spot generated by the transmission Raman spectroscopy apparatus shown in FIG. 5 moving in a spiral scan across the sample.

FIGS. 5 and 6 show an alternative embodiment of the invention. The same reference numerals but in the series 200 have been used for features of this embodiment that correspond to features of the embodiments shown in FIGS. 1 to 4.

This embodiment differs from the first embodiment in that instead of a stage 109 that moves in two linear direction, X and Y, the apparatus comprises a circular stage 209 rotatable about a central axis, ø, and a light source 201 that can move the light profile radially across the stage 209. The light source 201 may comprise a fibre optic (not shown) mounted such that an end of the fibre optic emitting the laser beam is movable relative to the stage 209.

As shown in FIG. 6, a spot 210 can be scanned across the sample 202 in a spiral motion 213 through an appropriate combination of rotation of the stage 209 and movement of the spot 210 in a radial direction, r. The rotation of the stage 209 and radial movement of the spot 210 may be arranged such that the linear velocity of the spot 210 is substantially constant. In FIG. 6, the spot 210 is shown starting at an outer radial position on the spiral scan 213 and moving towards the centre of the spiral 213.

Apparatus according to the embodiment shown in FIGS. 5 and 6 may have advantages in that constant scanning can be provided without any sudden changes in direction.

The apparatus may have application in the determination of whether a plurality of flowable materials, such as powders, have been adequately mixed. It may be useful to monitor the mixing of powders in manufacturing processes, such as the production of washing powder or tablets in medicine. In such a process, a sample of the mixed powders is taken from a mixing vessel and placed in the transmission Raman apparatus to obtain spectral data, in the manner as described above.

A predetermined reference spectrum for a mix of the plurality of flowable materials in a desired ratio is fitted to the spectral data using a direct least squares (DCLS) fitting technique. The fitting calculates a concentration (scale factor) for the predetermined reference spectrum. If the concentration is above a predetermined threshold, the powders are considered to be adequately mixed.

This method may be used as a go/no go check in a mixing process. If it is determined that a mixing process is not achieving an adequate mix, an alert may be generated to indicate that the mixing process is not producing the desired mixture.

The mixing apparatus may automatically stop when an alert is generated.

It will be understood that modifications and alterations can be made to the above described embodiments without departing from the invention as defined in the claims. For example, the light profile may be moved across the sample using different mechanisms, such as movable lenses or mirrors.

The invention claimed is:

1. A transmission Raman spectroscopy apparatus comprising:
   a light source for generating a light profile on a sample;
   a photodetector having at least one photodetector element;
   collection optics arranged to (i) collect light transmitted through the sample, the collected light comprising Raman scattered light generated through illumination of the sample by the light profile, and (ii) direct the Raman light from an acquisition volume onto the at least one photodetector element;
   a support for supporting the sample;
   a drive for moving the support relative to the light source such that the light profile can be moved relative to the sample; and
   a controller configured to control the drive such that the support is moved relative to the light source between a first position and a second position in order that the at least one photodetector element receives Raman light scattered from the first position and the second position and the at least one photodetector element accumulates charge representative of a summation of the received Raman scattered light from the first position and the second position, the controller being further configured to cause output of a signal representative of a total accumulated charge representing Raman scattered light received by the at least one photodetector element from a volume of the sample greater than a static acquisition volume of the light profile.

2. The transmission Raman spectroscopy apparatus according to claim 1, wherein the controller is arranged to control the photodetector, the light source, and the drive such that data on Raman light generated by interaction of the light profile with the sample are accumulated in the at least one photodetector element for a plurality of discrete locations of the light profile on the sample.

3. The transmission Raman spectroscopy apparatus according to claim 1, wherein the controller is arranged to control the photodetector, the light source, and the drive such that data on Raman light generated by interaction of the light profile with the sample accumulated in the at least one photodetector element from a volume of the sample greater than the static acquisition volume are read out from the photodetector before the at least one photodetector element collects data on Raman light generated by interaction of the light profile with a further volume of the sample.

4. The transmission Raman spectroscopy apparatus according to claim 1, wherein:
the at least one photodetector element comprises at least one row or column of photodetector elements, and
the controller is arranged to control the photodetector, the light source, and the drive such that data collected by the at least one photodetector element on Raman light generated by interaction of the light profile with a volume of the sample greater than the static acquisition volume are shifted to another photodetector element of the row or column synchronously with movement of the light profile to a further volume of the sample such that the at least one photodetector element can separately collect data on Raman light generated by interaction of the light profile with volumes of the sample.

5. The transmission Raman spectroscopy apparatus according to claim 1, wherein the controller is arranged to control the photodetector and the drive such that data is accumulated in the at least one photodetector element for a plurality of discrete locations of the light profile on the sample within a first region of the sample separately from data accumulated in the at least one photodetector element for a plurality of discrete locations of the light profile on the sample within a second region of the sample.

6. The transmission Raman spectroscopy apparatus according to claim 1, wherein the photodetector comprises a two-dimensional array of photodetector elements and the collection optics comprise a dispersive device for dispersing a spectrum of the Raman scattered light across at least one row or column of the array.

7. The transmission Raman spectroscopy apparatus according to claim 1, wherein the controller is further configured to control the drive so as to cause the light source to generate the light profile on the sample while the support is moved relative to the light source between the first position and the second position such that the at least one photodetector element is capable of accumulating charge while the support is moved relative to the light source from the first position to the second position.

8. A method of carrying out transmission Raman spectrometry on a sample, comprising:
moving a light profile on a sample;
accumulating, in a photodetector element, charge representative of a summation of Raman scattered light received from a plurality of discrete positions of the light profile on the sample due to collecting light transmitted through the sample, the collected light comprising the Raman scattered light for the plurality of discrete positions of the light profile on the sample; and
outputting a signal representative of a total amount of accumulated charge due to Raman scattered light received by the photodetector element from a volume of the sample greater than a static acquisition volume of the light profile.

9. A method of carrying out transmission Raman spectrometry on a sample, comprising:
moving a support supporting a sample relative to a light source generating a light profile on the sample between a first position and a second position in order that at least one photodetector element collects light transmitted through the sample, the collected light comprising Raman scattered light generated through illumination of the sample by the light profile from the first position and the second position, and the at least one photodetector element accumulating charge representative of a summation of the received Raman scattered light from the first position and the second position, and
outputting a signal representative of total accumulated charge representing Raman scattered light received by the at least one photodetector element from a volume of the sample greater than a static acquisition volume of the light profile.

* * * * *